(12) United States Patent
Mak

(10) Patent No.: US 8,316,665 B2
(45) Date of Patent: Nov. 27, 2012

(54) INTEGRATION OF LNG REGASIFICATION WITH REFINERY AND POWER GENERATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1133 days.

(21) Appl. No.: 11/908,766

(22) PCT Filed: Mar. 21, 2006

(86) PCT No.: PCT/US2006/010368
§ 371 (c)(1),
(2), (4) Date: Jul. 21, 2008

(87) PCT Pub. No.: WO2006/104799
PCT Pub. Date: Oct. 5, 2006

(65) Prior Publication Data
US 2008/0307789 A1 Dec. 18, 2008

Related U.S. Application Data

(60) Provisional application No. 60/667,002, filed on Mar. 30, 2005.

(51) Int. Cl.
*F25J 3/00* (2006.01)
(52) U.S. Cl. ............... 62/620; 62/623; 62/630; 62/618
(58) Field of Classification Search ............. 62/618, 62/620, 623, 630
See application file for complete search history.

(56) References Cited

U.S. PATENT DOCUMENTS

| | | | | |
|---|---|---|---|---|
| 2,952,984 A | | 9/1960 | Marshall, Jr. | |
| 3,238,735 A | * | 3/1966 | Siewert | 62/623 |
| 3,367,122 A | * | 2/1968 | Tutton | 62/630 |
| 3,393,527 A | * | 7/1968 | Swenson et al. | 62/621 |
| 3,398,546 A | * | 8/1968 | Nelson et al. | 62/630 |
| 3,405,530 A | * | 10/1968 | Denahan et al. | 62/630 |
| 3,524,897 A | | 8/1970 | Kniel | |
| 4,017,283 A | * | 4/1977 | Witt | 62/623 |
| 4,152,129 A | * | 5/1979 | Trentham et al. | 62/623 |
| 4,411,677 A | * | 10/1983 | Pervier et al. | 62/622 |
| 4,430,102 A | * | 2/1984 | Tedder | 62/628 |
| 4,444,015 A | * | 4/1984 | Matsumoto et al. | 60/648 |
| 4,778,498 A | * | 10/1988 | Hanson et al. | 62/623 |
| 4,900,347 A | * | 2/1990 | McCue et al. | 62/627 |
| 4,995,234 A | * | 2/1991 | Kooy et al. | 60/648 |
| 5,139,547 A | | 8/1992 | Agrawal et al. | |
| 5,394,686 A | * | 3/1995 | Child et al. | 60/780 |
| 5,457,951 A | * | 10/1995 | Johnson et al. | 60/780 |
| 6,195,997 B1 | | 3/2001 | Lewis et al. | |
| 6,564,579 B1 | | 5/2003 | McCartney | |
| 2003/0158458 A1 | * | 8/2003 | Prim | 585/800 |
| 2004/0231359 A1 | * | 11/2004 | Brostow et al. | 62/623 |
| 2005/0218041 A1 | | 10/2005 | Yoshida et al. | |

* cited by examiner

*Primary Examiner* — Allen J. Flanigan
*Assistant Examiner* — Jason Thompson
(74) *Attorney, Agent, or Firm* — Fish & Associates, PC

(57) ABSTRACT

Contemplated plants thermally integrate operation of a refinery component, and most preferably of a hydrocarbon splitter with LNG regasification to provide refrigeration duty and with a power cycle to provide the reboiler duty of the component. It should be noted that such configurations advantageously allow operation of the splitter at a reduced temperature and at reduced pressure, thereby increasing separation efficiency, while the power output is boosted using air intake chilling. Most notably, such process advantages are achieved by satisfying the heating duty of LNG regasification.

21 Claims, 3 Drawing Sheets

INTEGRATION OF LNG REGASIFICATION WITH REFINERY AND POWER GENERATION

This application claims priority to our U.S. provisional patent application with the Ser. No. 60/667,002, which was filed Mar. 30, 2005.

FIELD OF THE INVENTION

The field of the invention is LNG regasification and utilization, and especially use of LNG (liquefied natural gas) cold from regasification in processing plants and power generation plants.

BACKGROUND OF THE INVENTION

While natural gas has become an economically attractive commodity, liquefaction and regasification are remarkably energy intensive processes. In many instances, liquefaction of natural gas requires about 230 kW for each MMscfd of high-pressure natural gas, which corresponds to about 280 MW of power in a 1,200 MMscfd liquefaction plant. On the other hand, regasification of 1,200 MMscfd LNG requires about 750 MM Btu/hr of heating duty.

Most typically, heating duty is supplied by heat exchange with seawater cooling about 100,000 gpm of seawater by 15° F., or using combustion heat from 20 MMscfd of fuel gas, which is equivalent to about 1.5% of the import LNG. Unfortunately, the ecologic impact in either scenario, and especially over prolonged periods is significant. Thus, most conventional LNG regasification processes are energy inefficient or often environmentally problematic. At least theoretically, some of the power consumed in LNG liquefaction may be recoverable at the LNG receiving terminal if the LNG is used as a refrigerant in processing facilities or as a heat sink in power generation. Indeed, there are potentially significant synergies between power generation and LNG regasification. For example, waste heat from gas turbine exhaust is readily available as a heat source for LNG regasification. Similarly, integration with a processing facility such as a refinery or chemical plant may be especially beneficial as the waste heat from these facilities can be used for regasifying LNG.

Among other known configurations and methods, Mandrin and Griepentrog describe in U.S. Pat. Nos. 4,036,028 and 4,231,226, respectively, integration of a power plant with LNG regasification. Similar plant configurations are reported in published U.S. Pat. App. No. 2003/0005698 to Keller, EP 0 683 847 to Johnson et al., and WO 02/097252 to Keller. In such known configurations, heat for regasification of LNG is typically provided by a heat exchange fluid, which is in thermal exchange with a gas turbine intake air or flue gas exhaust. These configurations improve the efficiency of the gas turbine cycle by densifying the inlet air, thereby increasing its power output and efficiency. However, such LNG regasification processes rely on the heat content in the gas turbine intake air for LNG heating that may not be available during winter months, especially in colder climates. Therefore, additional heating with conventional methods is often necessary.

Thus, while all or almost all of such improved configurations and methods provide at least some advantages over previously known configurations, various disadvantages still remain. Among other things, most of the known methods fail to provide continuous sources of heating for LNG regasification, and therefore rely on supplementary heating. Therefore, there is still a need for improved plant configurations and methods of thermal integration of LNG regasification.

SUMMARY OF THE INVENTION

The present invention is directed to configurations and methods of integrated plants in which the energy requirements (and particularly overhead condensation and reboiler duty) for a column, and especially for a hydrocarbon splitter are provided by a LNG regasification operation and/or heat extraction from a power generating section of contemplated plants.

In one aspect of the inventive subject matter, a plant includes a hydrocarbon splitter having a reboiler and an overhead condenser (A hydrocarbon splitter separates materials with relatively close boiling points [e.g., a paraffin (e.g. propane C3) from its olefin counterpart (e.g propylene C3=)]). A first heat exchange circuit is thermally coupled to a liquefied natural gas stream and the hydrocarbon splitter such that refrigeration content from the liquefied natural gas stream is provided to the overhead condenser via a first exchange fluid, and a second heat exchange circuit is thermally coupled to a heat source, the hydrocarbon splitter, and the liquefied natural gas stream such that heat from the heat source is transferred to the reboiler and the liquefied natural gas stream via a second exchange fluid.

Therefore, in another aspect of the inventive subject matter, a method of operating a hydrocarbon splitter will include a step of providing refrigeration duty to an overhead condenser of the hydrocarbon splitter using a first heat exchange fluid that is cooled by liquefied natural gas. In a further step, a second heat exchange fluid that is heated by a heat source and cooled by the liquefied natural gas provides reboiler duty of the hydrocarbon splitter. Viewed from a different perspective, a method of operating a plant comprising a power generating section and a liquefied natural gas regasification section may include a step of using refrigeration content in the liquefied natural gas to provide overhead condensation duty of a column, and a further step of using heat from the power generating section to provide reboiling duty of the column to thereby regasify the liquefied natural gas.

In especially preferred aspects, the heat source is an air intake chiller, a heat recovery unit, a flue gas heat exchanger, a fired heater, and/or a seawater exchanger, and the hydrocarbon splitter is a C3 splitter (separating propane from propylene) and/or a C2 splitter (separating ethane from ethylene). Typically, the hydrocarbon splitter is configured to operate at a pressure of less than 100 psia, and most typically at a pressure of between about 30 psia and about 60 psia. In further generally preferred aspects, the first heat exchange circuit is configured and coupled to the liquefied natural gas stream such the liquefied natural gas stream is heated from a temperature of about −250° F. to a temperature of about −100° F. to −60° F., and/or the second heat exchange circuit is configured and coupled to the liquefied natural gas stream such the liquefied natural gas stream is heated from a temperature of about −100° F. to −60° F. to a temperature of about 40° F.

Additionally, contemplated plants may also include a separation column that is fluidly coupled to the splitter such that the separation column provides a bottom product to the splitter. In at least some of these embodiments, the separation column further includes a reflux condenser that is thermally coupled to the first heat exchange circuit. Therefore, the refrigeration content of the LNG is employed to provide refrigeration duty to at least two columns. Preferably, in such configurations the hydrocarbon splitter is a C3 splitter and the separation column is a deethanizer.

Various objects, features, aspects and advantages of the present invention will become more apparent from the following detailed description of preferred embodiments of the invention.

BRIEF DESCRIPTION OF THE DRAWINGS

Prior Art

DETAILED DESCRIPTION

The inventor discovered that LNG can be regasified in a plant configuration in which one or more refinery processes and/or power generation schemes provide a continuous heat source for regasification. Most preferably, LNG regasification is achieved using at least two heating stages, wherein the first heating stage employs a heat transfer fluid that is thermally coupled with a refinery component (and especially an overhead condenser), and wherein the second heat stage employs another heat transfer fluid that is thermally coupled with a power generation component (and especially an intake air chiller and/or flue gas exchanger).

For example, in one preferred aspect, a regasification terminal is thermally coupled to a hydrocarbon splitter, and especially a C3 splitter in a refinery to produce C3 (propane) and C3= (propylene) products, while the C3 splitter generates refrigerant for chilling gas turbine inlet air for power production. Additionally, LNG regasification can be further thermally coupled to a deethanizer and C2 splitter. Alternatively, in another preferred aspect and viewed from a different perspective, two heat transfer circuits may be employed. One circuit uses the LNG cold to provide cooling to the reflux condenser(s) of the thermally coupled C3 splitter and/or deethanizer, while the other circuit uses heat extracted from gas turbine inlet air and the exhaust stack to provide heating to the C3 splitter reboiler and LNG vaporizers. It should be noted that integration with a C3 (propane/propylene) splitter will provide significant energy and capital savings, especially where the large reflux condenser duty can be supplied by the refrigeration content in LNG.

In such configurations, it should be especially appreciated that using low temperatures from the LNG the C3 splitter can be operated at lower temperatures and at significantly lower pressure, while the C3 splitter reboiler further rejects lower level refrigeration of the partially warmed LNG that can be used to chill gas turbine inlet air for power production. Therefore, it should be recognized that in contemplated configurations, one or more heat transfer circuits in a plant (e.g., among the LNG regasification unit, a refinery section, and a power generating section) significantly increase the overall thermal efficiency. The same thermal fluid or different thermal fluids can be employed in heat transfer among the different operations.

Figure 1:
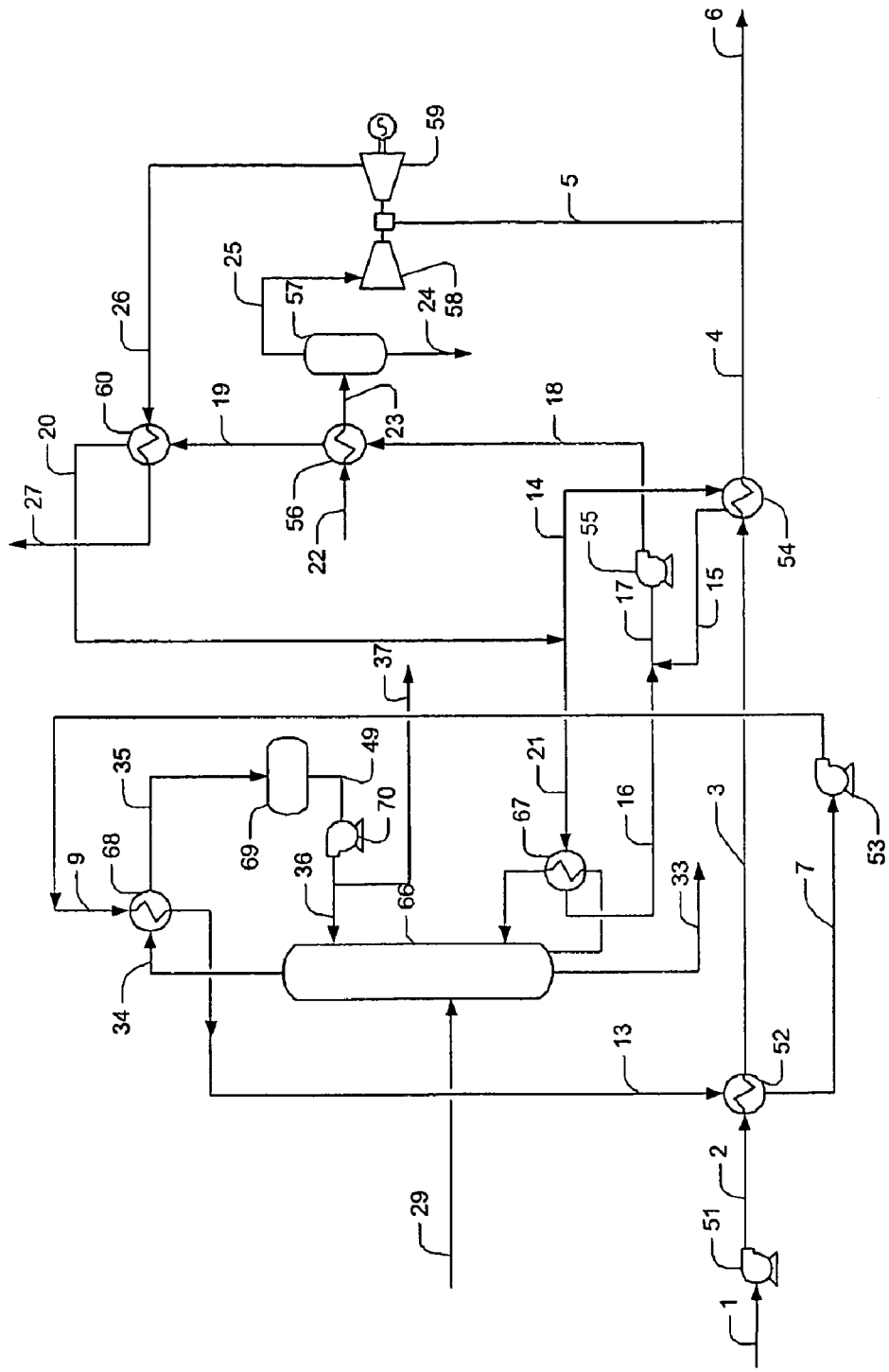
FIG. 1 is one exemplary configuration according to the inventive subject matter.

One especially preferred plant according to the inventive subject matter is depicted in FIG. 1 in which a C3 splitter is thermally integrated with a power generation plant and a LNG regasification plant. While not limiting to the inventive subject matter, it is generally preferred that such plants employ at least two separate heat transfer circuits, in which the first circuit utilizes the LNG cold to separate C2 from C2= in a C2 splitter and/or C3 from C3= in a C3 splitter by providing cooling to the reflux condensers of the C2 or C3 splitter and the deethanizer, while the second circuit uses heat extracted from the gas turbine inlet air and exhaust stack to provide heating to the C2 or C3 splitter reboiler and LNG vaporizers. The same thermal fluid or different thermal fluids can be employed in heat transfer among the different units.

Here, LNG stream 1, typically at a sendout rate of about 500 MMscfd, is pumped by the LNG pump 51 to pipeline pressure at about 1250 psia forming stream 2. The LNG is then heated in heat exchanger 52 and heat exchanger 54 using the two heat transfer circuits. Most preferably, the heat transfer medium for both circuits is non-freezing at the respective LNG (cryogenic) temperatures and has favorable heat transfer characteristics. Exemplary suitable heat transfer media include glycol-water mixtures, or multi-component mixtures well known in the art. In the configuration of FIG. 1, the LNG is heated in exchanger 52 from about −250° F. to about −100° F. to −60° F., forming stream 3 using the first heat transfer circuit stream 13. LNG is further heated in exchanger 54, from about −100° F. to −60° F. to about 40° F., forming stream 4 using the second heat transfer circuit stream 14. A portion of the vaporized product, stream 5, is used as fuel gas to the gas turbine while the remainder is delivered as stream 6 to a pipeline or other receiving facilities. As used herein, the term "about" in conjunction with a numeral refers to a range of +/−10% (inclusive) of that numeral. For example, the term "about 200 psia" refers to a range of 180 psia to 220 psia, inclusive. Similarly, the term about −100° F. to −40° F. refers to a temperature range of between −110° F. to −36° F.

The C3 splitter 66 fractionates the feed stream 29 (typically from a refinery feed gas) into overhead stream 34 (C3=) and a bottom stream 33 (C3). It should be noted that by using LNG as refrigerant, the conventional vapor compressor (152 in Prior Art FIG. 3) is not required. It should be further especially recognized that the C3 splitter can operate at a significantly lower pressure, at typically about 40 psia or lower (as compared to 150 psia and higher of prior art design), which substantially improves the fractionation efficiency. At lower pressure and temperature, the relative volatility between the C3 and C3= are increased, resulting in a more efficient separation requiring lower energy consumption. With favorable thermodynamic characteristics, the number of fractionation trays can also be reduced by over 30%, significantly reducing the cost of the splitter installation.

In the C3 splitter, the overhead stream 34 is condensed in condenser 68 to about −10° F. and 40 psia, forming stream 35 using the first heat transfer circuit stream 9 (thereby forming stream 13, which is pumped by pump 53. Therefore, the condenser duty is supplied by the circulating heat transfer medium 9 that is heated in exchanger 68 to form stream 13, which is then chilled by LNG in exchanger 52 to thereby form stream 7). It should be pointed out that the supply temperature of first heat transfer medium can be as low as about −40° F., which advantageously reduces the heat exchanger area and cost of condenser 68. The overhead stream 49 is separated from reflux drum 69 and is pumped by reflux pump 70, generating reflux stream 36 to the C3 splitter and stream 37, the C3= product. The C3 splitter reboiler 67 is supplied by the second heat transfer circuit that uses heat from the combustion gas turbine inlet chiller 56 and from the gas turbine exhaust exchanger 60. The second heating circuit also supplies heat to second LNG heat exchanger 54.

The C3 splitter bottom is typically maintained at a temperature of about 18° F. and a pressure of about 55 psia. The C3 splitter reboiler duty is supplied by the second heat transfer circuit stream 21, which is heated by the gas turbine inlet air chiller 56 and the gas turbine exhaust exchanger 60. Stream 21 is cooled from about 60° F. to about 28° F. to form stream 16 providing heating to reboiler 67, and is then combined with stream 15 from exchanger 54, forming the stream 17 at about 38° F. The mixed stream is then pumped by the circulating pump 55 forming 18 that is used to chill the gas turbine inlet in exchanger 56 (and so forms stream 19). Inlet air 22 is chilled typically from about 80° F. to about 45° F. in exchanger 56, forming stream 23. At this point, most of the water content in the air is condensed and removed from separator 57 as stream 24, which can be used to supply the water makeup requirement to a steam boiler system. The chilled air stream 25 is then fed to the gas turbine 58/59 for power generation.

When air is chilled to such relatively low temperature, mass density of air increases significantly, resulting in an increase in air mass flow (as gas turbines operate on constant volumetric flow), subsequently increasing the gas turbine power output. Further, colder air temperature also reduces the power consumption by the compressor section 58 of the gas turbine, increasing the gas turbine (Brayton Cycle) power generation efficiency. Typically, for every 3° F. to 4° F. decrease in intake air temperature, power output from the power plant is increased by about 1%. When ambient temperature is reduced from 100° F. to 40° F. during summer operation, the power output of a conventional combined cycle power plant can be increased by over 15%. Such increase in power output represents a significant increase in power revenue, especially during summer months when the consumer demand peaks and electricity can be sold at a premium. Turbine exhaust 26 is then cooled by second medium stream 19 in exchanger 60 to form cooled exhaust 27 and warmed medium stream 20, at least a portion of which then provides heat to the reboiler 67. The remaining portion is routed to exchanger (typically vaporizer) 54 as stream 14.

Figure 2:
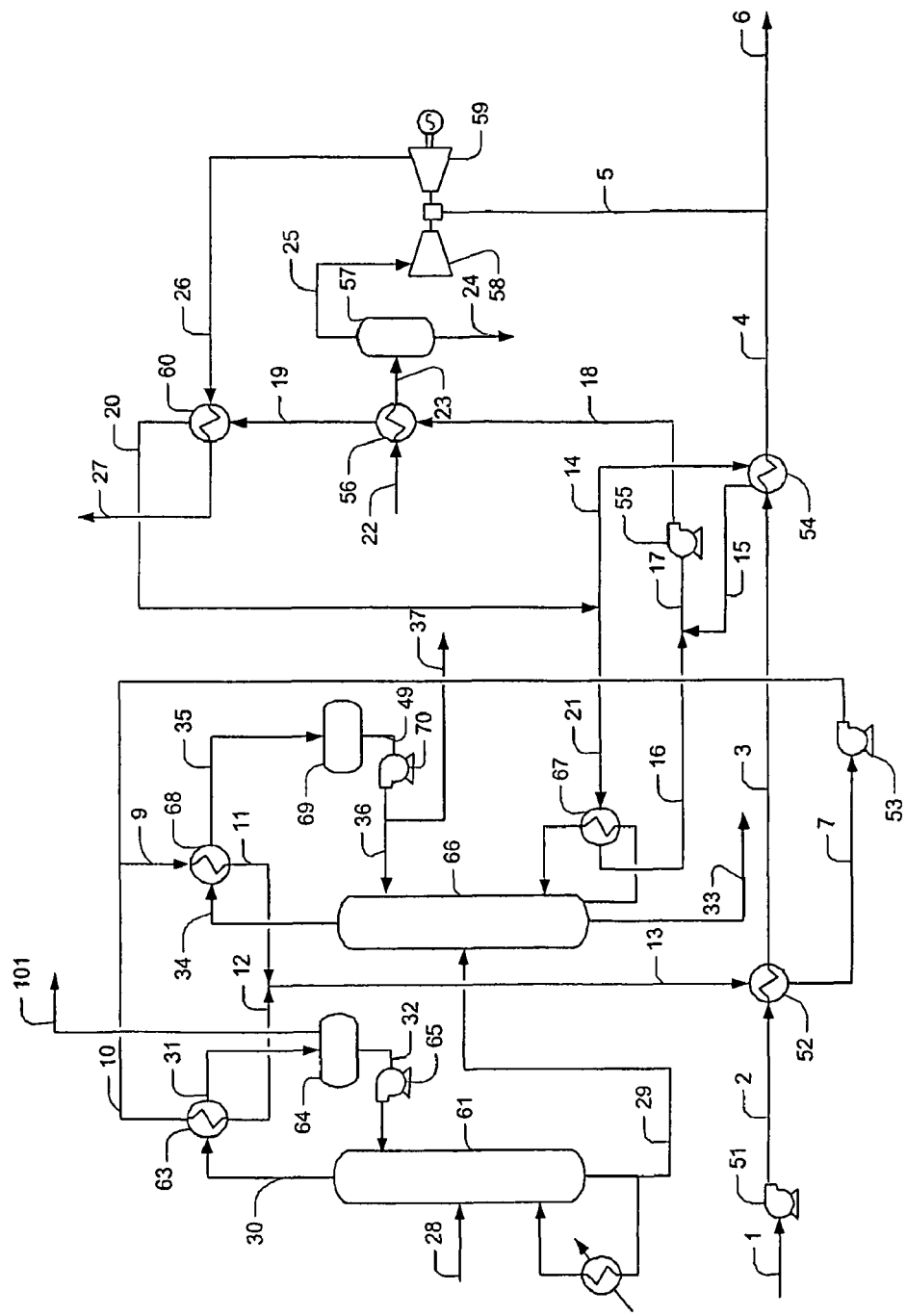
FIG. 2 is another exemplary configuration according to the inventive subject matter.

It should be appreciated that the same configuration is also applicable to a C2 splitter for even higher energy savings. In such configurations, the C2 splitter will generally operate at lower temperatures than the C3 splitter. Typically, the C2 splitter overhead is kept at about −40° F. or lower, as compared to about 20° F. in the C3 splitter. When applied to a C2 splitter, the low temperature of LNG can be more efficiently utilized. Similarly, the reboiler duty from the C2 splitter can be used to chill gas turbine inlet in the inlet chiller, similar to the configuration for the C3 splitter shown above.

Where desirable, the C3 splitter can also be preceded with a deethanizer as depicted in FIG. 2. Here, feed stream 28 (containing C2, C3=, and C3) is fed to a deethanizer 61 that produces an ethane overhead stream 30 and a mixed C3= and C3 bottom stream 29. The bottom stream 29 is then fed to the downstream C3 splitter 66. In such plants, the deethanizer overhead stream 30 is chilled and condensed in overhead exchanger 63 forming stream 31, with cooling duty supplied by a portion of the first heat transfer circuit stream 10, thereby forming stream 12. The so cooled overhead stream is then separated in separator 64 into the C2 product stream 101 and a reflux stream 32 that is pumped by pump 65 returning to the deethanizer. With respect to remaining component of FIG. 2, the same considerations for elements as discussed for FIG. 1 above apply for like components with like numerals in FIG. 2.

It should be appreciated that in contemplated plants the power generation section, the C3 splitter (or other component in a refinery section), and the LNG regasification plant are thermally coupled such that waste heat from a gas turbine exhaust can be a supplementary heat source for LNG vaporization and the reboiler duty of the C3 splitter. Alternatively, or additionally, LNG may also be employed in cooling and/or as a refrigerant in the deethanizer and C2= splitter, further reducing the refrigeration requirement of the refining complex. Thus, in such configurations, integration of the import LNG to a refining complex and a power plant can be economically attractive. It should further be recognized that C3= is the building block for polypropylene, which is presently the fastest-growing thermoplastic. The use of a thermally coupled C3 splitter with LNG can produce high quality C3= products that can be used as feedstock for polypropylene manufacture, without the use of the conventional fractionation methods such as vapor recompression or other traditional fractionation methods for the production of a highly pure C3= stream.

In contrast, currently known C3 splitter configurations will typically not achieve these and other advantages. A typical known plant configuration with a C3 splitter is depicted in Prior Art FIG. 3, and a typical material balance of the C3 splitter unit for the production of a 13,000 BPD polymer grade C3= (99.5% purity) is shown in Table 1 below.

TABLE 1

| MOL % | FEED | C3 | C3= |
|---|---|---|---|
| C3 | 0.300 | 0.9549 | 0.005 |
| C3= | 0.700 | 0.0451 | 0.995 |
| Std. Barrels per day | 20,000 | 7,000 | 13,000 |

Figure 3:
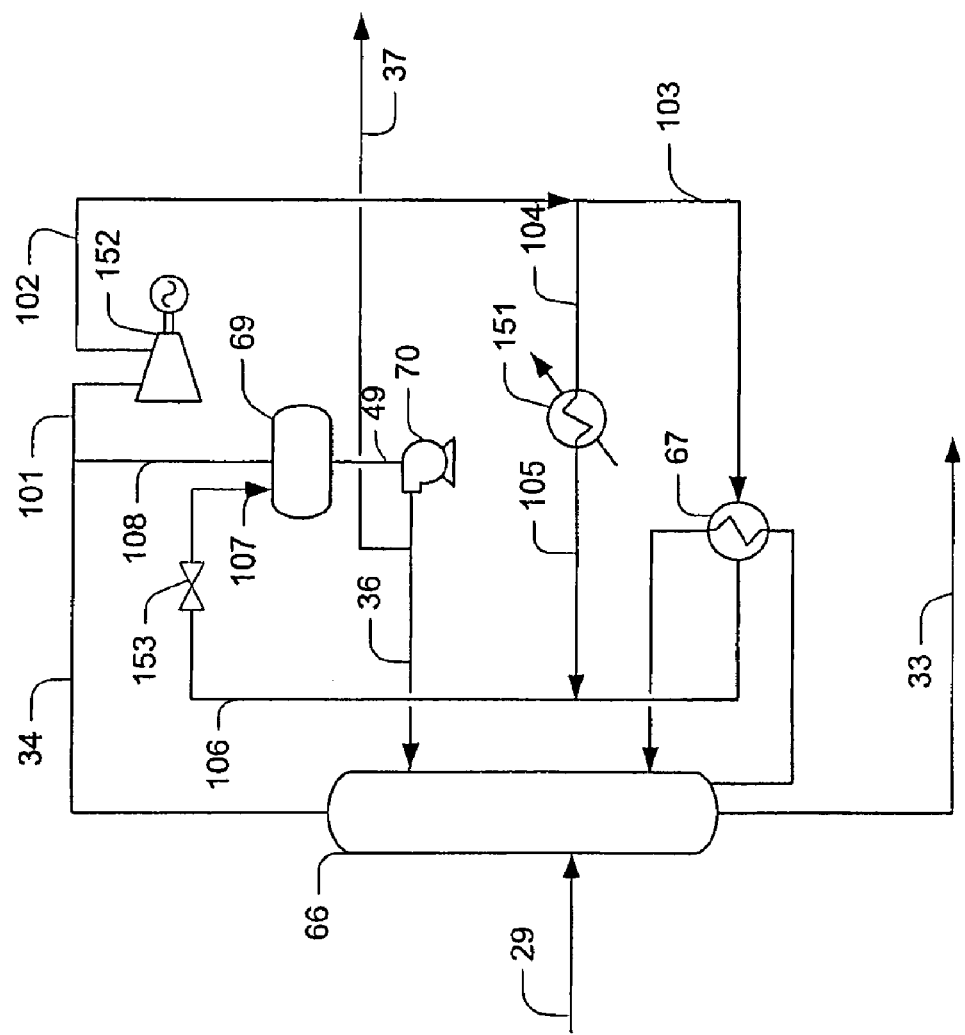
FIG. 3 is an exemplary known configuration for operation of a C3 splitter.

In the plant of FIG. 3, the feed stream 29 is a deethanized product from an upstream deethanizer typically comprising about 30% C3 and about 70% C3=. Large number of trays (typically 240) are typically required for the C3 splitter due to the difficulty to separate C3= from C3, which is mainly dictated by the very close relative volatility between the C3 and C3= components at the ambient overhead temperatures. In addition, production of a highly pure (99.5% purity) C3= product to meet the polymer quality requirement also demands higher reboiler and condenser duties.

Here, the C3 splitter 66 fractionates the feed stream into overhead stream 34 (C3=) at about 70° F. and about 150 psia, and a bottom stream 33 (C3) at about 90° F. and about 165 psia. The splitter is refluxed with stream 36 that is generated by the vapor compression system. The flashed vapor stream 108 from separator 69 is combined with the C3 splitter overhead stream 34, forming stream 101 which is compressed by the vapor compressor 152 to about 250 psia forming the discharge vapor stream 102. Typically about 8000 horsepower is required by the vapor compressor for a 20,000 BPD C3 splitter unit. Vapor stream 102 is condensed at about 100° F. by providing the heating duty to reboiler 67. For temperature control, a portion of the vapor (stream 104) is cooled by cooling water in exchanger 151 forming stream 105, which is combined with the cooled stream from exchanger 67. The so formed combined stream 106 is letdown in a JT valve 153 to about 150 psia forming stream 107. The JT effect cools stream 107 to about 75° F. The liquids are then separated in the separator 69 as liquid stream 49 that is pumped by pump 70 to provide reflux to the C3 splitter as stream 36. The remaining liquid is withdrawn as the C3= product stream 37. It should be recognized that while such configurations typically provide reasonable separation of the C3 compounds, significant quantities of energy must be invested. Moreover, substantial equipment costs are typically needed if relatively pure C3= is desired due to the relatively large number of trays. Where such C3 splitter plants are separated from an LNG regasification plant, thermal coupling of LNG regasification and C3 splitting is typically not realized.

In contrast, the use-of LNG cold for refluxing the C3 splitter in contemplated configurations advantageously allows the fractionation column to operate at a substantially lower pressure than in conventional plants, which significantly improves the fractionation efficiency. Lower column pressure increases the relative volatility difference between C3= and C3, resulting in better separation, requiring less fractionation trays and energy requirements. Therefore, and among other advantages, contemplated configurations and methods significantly reduce the capital and operating cost of the refining complex while eliminating the vapor compression equipment in the C3 splitter and reducing the cooling and heating duties in the deethanizer and C2 splitter of conventional designs. Still further, energy expenditure otherwise needed for LNG regasification is largely, and more typically entirely avoided.

It should be especially noted that the second heat transfer circuit in preferred configurations utilizes the heat content from the gas turbine inlet air and/or its exhaust to supply the reboiler requirement by the C3 splitter and the LNG regasification duty. Thus, contemplated configurations use the chilled heat transfer circuit to cool the gas turbine intake air. Furthermore, the chilled second heat transfer circuit condenses most of the moisture content from the intake air which can be recovered as boiler feed water makeup (e.g., to a steam power plant). It should also be particularly noted that such gas turbine inlet cooling configuration results in an increase in power output and generation efficiency.

Among other suitable feed gases, contemplated gases include those with appreciable C3 and C3= content. Therefore, refrigeration content from LNG may be employed in the separation and purification of propylene from a cracked gas (which may also comprise ethane, ethylene, propylene, dimethyl ether, and one or more of propane, acetylene, methyl acetylene, propadiene, methane, hydrogen, carbon monoxide, carbon dioxide and C4+ components), typically from a refinery FCC Unit and/or the Coker unit. Where a deethanizer is used, it is generally preferred that the deethanized cracked gas is fed to a C3 splitter which is thermally coupled with a first heat transfer circuit that is chilled with LNG, and the bottom of C3 splitter reboiler is heated with a second heat transfer circuit that is heated with gas turbine inlet air and its exhaust. The second heat transfer circuit will then supply the required heating to the LNG vaporizers. Further suitable feed gases include various NGL (light hydrocarbons) fractions, partially purified (e.g., at least 30%, more typically at least 50%, most typically at least 85% purified) C3 gases, and so forth.

In still further contemplated aspects of the inventive subject matter, it should be recognized that numerous alternative configurations for the heat transfer circuits may also be suitable. For example, where appropriate, the two heat transfer circuits may be combined in a single circuit that is routed between the LNG regasification section, and at least one of a refinery section and a power producing section. On the other hand, where desired, one or more additional heat transfer circuits may be added to contemplated configurations to further improve thermal efficiency. For example, additional circuits may be used as back-up heat sinks and/or heat sources (e.g., to compensate for seasonal ambient temperature changes, or additional cold sinks such as additional condensers, etc.). Furthermore, additional circuits may be provided where a plant is expanding operations or processing volume.

Similarly, it should be recognized that various heat sources other than the intake air chilling and flue gas cooling are suitable for use herein, and especially preferred heat sources include HRSG units, high- and low-level waste heat from exothermic processes or otherwise heated process streams, geothermal heat, combustion heat, and/or ambient heat (e.g., using seawater or ambient air). Further suitable alternative cold sinks may be feed gas and other exchangers, various condensers (overhead condenser, steam cycle condenser, etc.), and generally all components and/or streams commonly found in a power generation plant or section and/or refinery plant or section.

Further considerations and aspects of LNG regasification and processing of LNG with variable composition and integration of a power plant with LNG liquefaction are described in our copending International applications having the serial numbers PCT/US03/25372, PCT/US03/26805, and PCT/US05/24973, all of which are incorporated by reference herein.

Thus, specific embodiments and applications of integration to a C3 splitter and power production have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A plant, comprising:
   a hydrocarbon source configured to provide a processed hydrocarbon feed enriched in C2 and/or C3 hydrocarbons;
   a C2 or C3 hydrocarbon splitter having a reboiler and an overhead condenser fluidly coupled to the hydrocarbon source and configured to receive the processed hydrocarbon feed;
   a first closed heat exchange circuit comprising a first heat exchange fluid and thermally coupled to a liquefied natural gas stream and the hydrocarbon splitter such that the first heat exchange fluid receives refrigeration content from the liquefied natural gas stream and provides refrigeration content to the overhead condenser; and
   a second closed heat exchange circuit comprising a second heat exchange fluid and thermally coupled to a heat source, the hydrocarbon splitter, and the liquefied natural gas stream such that heat from the heat source is provided to the second heat exchange fluid and transferred from the second heat exchange fluid to the reboiler and the liquefied natural gas stream.

2. The plant of claim 1 wherein the heat source is selected from the group consisting of an air intake chiller, a heat recovery unit, a flue gas heat exchanger, a fired heater, and a seawater exchanger.

3. The plant of claim 1 wherein the hydrocarbon splitter is a C2 splitter.

4. The plant of claim 1 wherein the hydrocarbon splitter is configured to operate at a pressure of less than 100 psia.

5. The plant of claim 1 wherein the hydrocarbon splitter is configured to operate at a pressure of between about 30 psia and about 60 psia.

6. The plant of claim 1 wherein the first heat exchange circuit is configured and coupled to the liquefied natural gas stream such the liquefied natural gas stream is heated from a temperature of about −250° F. to a temperature of about −100° F. to −60° F.

7. The plant of claim 1 wherein the second heat exchange circuit is configured and coupled to the liquefied natural gas stream such the liquefied natural gas stream is heated from a temperature of about −100° F. to −60° F. to a temperature of about 40° F.

8. The plant according to claim 1 further comprising a separation column that is fluidly coupled to the splitter such that the separation column provides a bottom product to the splitter.

9. The plant of claim 8 wherein the separation column further includes a reflux condenser that is thermally coupled to the first heat exchange circuit.

10. The plant of claim 8 wherein the hydrocarbon splitter is a C3 splitter and wherein the separation column is a deethanizer.

11. A method of operating a C2 or C3 hydrocarbon splitter, comprising
feeding a processed hydrocarbon feed enriched in C2 and/or C3 hydrocarbons as a feed gas to the C2 or C3 hydrocarbon splitter;
providing refrigeration duty to an overhead condenser of the C2 or C3 hydrocarbon splitter from a first heat exchange fluid in a first closed heat exchange circuit that is cooled via heat exchange with a liquefied natural gas; and
providing reboiler duty of the C2 or C3 hydrocarbon splitter using a second heat exchange fluid in a second closed heat exchange circuit that is heated via heat exchange with a heat source and cooled via heat exchange with the liquefied natural gas.

12. The method of claim 11 wherein the heat source is selected from the group consisting of an air intake chiller, a heat recovery unit, a flue gas heat exchanger, a fired heater, and a seawater exchanger.

13. The method of claim 11 wherein the hydrocarbon splitter is a C2 splitter.

14. The method of claim 11 wherein the hydrocarbon splitter is operated at a pressure of less than 100 psia.

15. The method of claim 11 wherein the hydrocarbon splitter is operated at a pressure of between about 30 psia and about 60 psia.

16. The method of claim 11 wherein the first heat exchange circuit heats the liquefied natural gas stream from a temperature of about −250° F. to a temperature of about −100° F. to −60° F.

17. The method of claim 11 wherein the second heat exchange circuit heats the liquefied natural gas stream from a temperature of about −100° F. to −60° F. to a temperature of about 40° F.

18. The method of claim 11 wherein a separation column is fluidly coupled to the splitter to thereby provide a bottom product to the splitter.

19. The method of claim 18 wherein the separation column further includes a reflux condenser that is thermally coupled to the first heat exchange circuit.

20. The method of claim 18 wherein the hydrocarbon splitter is a C3 splitter and wherein the separation column is a deethanizer.

21. A method of operating a plant comprising a power generating section and a liquefied natural gas regasification section, comprising:
using refrigeration content in the liquefied natural gas to provide overhead condensation duty of a column using a first heat exchange fluid in a first closed heat exchange circuit that transfers refrigeration from the liquefied natural gas to an overhead exchanger; and
using heat from the power generating section to provide reboiling duty of the column using a second heat exchange fluid in a second closed heat exchange circuit that transfers heat from the power generating section to a reboiler of the column; and
using the first and second heat exchange fluids to regasify the liquefied natural gas.

* * * * *